208-111
1/6/87 03 4 000,191

United States Statutory Invention Registration [19]

[11] Reg. Number: H191

Edwards et al. [43] Published: Jan. 6, 1987

[54] SMALL PARTICLE ZEOLITE CONTAINING CATALYTIC CRACKING CATALYST

[75] Inventors: Grant C. Edwards, Silver Spring; Kuppuswamy Rajagopalan, Columbia, both of Md.

[73] Assignee: W. R. Grace & Co., New York, N.Y.

[21] Appl. No.: 741,500

[22] Filed: Jun. 5, 1985

[51] Int. Cl.[4] ..... C01G 47/02; C01G 47/12; C01G 47/16; B01J 29/06

[52] U.S. Cl. ..... 208/111; 502/65

[58] Field of Search ..... 502/65

[56] References Cited

U.S. PATENT DOCUMENTS 3,755,538 8/1973 Albers et al. ..... 423/328 X 3,957,689 5/1976 Ostermaier et al. ..... 502/65

*Primary Examiner*—Richard D. Lovering

*Assistant Examiner*—Eric Jorgensen

*Attorney, Agent, or Firm*—Arthur P. Savage

[57] ABSTRACT

A catalyst composition containing 5 to 50 weight percent of small particle type Y faujasite zeolite is described. A cracking process using the above catalyst can be used to obtain increased conversion of the heavier portion of commercial crudes as well as to generate increased yield of gasoline and distillate.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SMALL PARTICLE ZEOLITE CONTAINING CATALYTIC CRACKING CATALYST

BRIEF DESCRIPTION OF THE INVENTION

The present invention relates to the preparation of Y type faujasite zeolite having a smaller than conventional particle size which is formulated into a catalytic cracking catalyst composition that exhibits a markedly improved liquid product selectivity in the conversion of heavier boiling modern crude feedstocks.

Thus, the present invention is particularly directed to overcoming the problem of the increasing utilization of residual oil found in today's crude oil feedstocks by providing a catalytic cracking catalyst composition which exhibits exceptionally improved selectivity for conversion of the heavier boiling fraction of hydrocarbon feedstocks as well as improved selectivity for liquid products, i.e. gasoline and distillates.

This and other objectives of the subject invention will become more clearly understood as the description of the invention proceeds.

DETAILED DESCRIPTION OF THE INVENTION

The present invention relates to the preparation and use of cracking catalyst which comprises small particle crystalline alumino-silicate zeolites dispersed in an inorganic oxide matrix. Particle size of zeolites is determined conventionally using Scanning Electron Micrographs (SEM). Presence of agglomeration and intergrowths in Y faujasite make this estimate uncertain. We have developed a novel method of measuring an effective (average) particle size by measuring the external surface area per unit mass of the zeolite. This measurement is based on t plot isotherm method described by Lippens and deBoer (Journal of Catalysis, Volume 4, pages 319–323 (1965)) and improvements suggested by Lecloux and Pirard (Journal of Colloid and Interface Science, Volume 70, No. 2, pages 265 to 281 (1979)). T plot is a graphical representation of volume of nitrogen adsorbed at liquid nitrogen temperature as a function of statistical thickness of $N_2$ film on a solid surface. Slope of the t plot is related to accessible surface area. In an appropriate region of the t plot when adsorption takes place exclusively on the external surface, slope of the t plot is related to external surface area. Effective particle size is defined as that uniform dimension of cubic particles which yields the same external surface area per unit mass as the measured value for a zeolite sample. More specifically, this invention relates to the preparation of catalysts which contain small particle synthetic Type Y faujasite materials having a silica to alumina ratio above 4.5 and an effective particle size range of about 0.05 to 0.3 micrometer.

The preparation of conventionally sized faujasite materials, i.e. materials having effective particle size of 0.3 to 0.4 micrometer is disclosed in the prior art in U.S. Pat. No. 3,130,007 which describes the synthetic faujasite designated as "zeolite Y" and other patents such as U.S. Pat. Nos. 3,185,544, 3,433,589 and 3,574,538 which teach other versions of essentially similarly sized Y type faujasitic synthetic materials.

We will now describe some prior art patents where particle size determined by SEM was used in text and claims.

Canadian 817,405 and 852,713 disclose the use of catalytically active zeolites having a preferred particle size of 200 to 2000 A° (0.02 to 0.2 micrometer) and 200 to 10,000 A° (0.02 to 1.0 micrometer) respectively to convert heavy hydrocarbons into products of lower molecular weight. The use of catalysts which include a matrix compound is not disclosed.

British 1,223,592 discloses the preparation of Type X crystalline aluminosilicate zeolite which have a predetermined particle size in the range of 0.01 to 100 micrometers. The reference indicates that the very small zeolite particles may be combined with a matrix to obtain catalysts having improved diffusion mol catalytic properties.

U.S. Pat. No. 3,185,544 describes the preparation of crystalline aluminosilicate zeolites from clay which have distinct particles of a definite size within the range of 0.1 to 5 micrometer. The use of zeolites having a controlled particle size to prepare petroleum cracking catalysts is disclosed.

U.S. Pat. No. 3,313,594 describes the preparation of crystalline aluminosilicate zeolite particles of uniform size wherein a significant fraction of the zeolite product may be below 2 micrometers. The uniform sized zeolite product may be used in the preparation of hydrocarbon conversion (FCC) catalysts.

U.S. Pat. No. 3,516,786 describes the preparation of microcrystalline faujasite-type zeolites having a particle size of 10 to 100 millimicrons (0.01 to 0.1 micrometer) which may be used in the preparation of catalytic cracking catalysts.

U.S. Pat. No. 3,755,538 describes a method for preparing zeolites wherein the particle size may be optimized in the range of 0.1 to 0.3 micrometer. The zeolite products are described as having valuable catalytic properties when used in the preparation of cracking catalysts.

The need to research faujasite material synthesis modifying methodology parameters to effect product property variations has become particularly acute in recent times when due to economical and political considerations it is becoming increasingly important to develop petroleum cracking catalysts which can cope with the high residual oil content in today's crude feedstocks.

Until recently, residual oil represented a small (about 10%) portion of the crude oil. Relatively inexpensive, light, low sulfur feedstocks were available for cracking. Naphtha, kerosene, and light fuel oil obtained by simple distillation are usually processed to improve product quality without molecular weight reduction. In a typical refinery, the heavy gas oil (boiling range of about 340°–565° C.) is obtained as a product from vacuum distillation. The FCC unit reduces the molecular weight of this fraction primarily to gasoline. The vacuum residual oil is processed to make coke plus coker gas oil or a residual fuel oil. Recently this alternative has become less attractive because the high sulfur content of the residual oil remains in the products and can create $SO_x$ emissions during burning of the coke or oil. Furthermore, economic and political pressures have forced refiners to process some of the heavier feedstocks such as Arab Medium and Arab Heavy. These crude oils contain more vacuum residual fraction and less light products. The residual oil contains increased amounts of sulfur and contaminant metals. As the amount of residual oil in feedstocks has increased, quality has decreased and the market for conventional products such as coke or heavy fuel oil has declined. As a result, some refiners have developed processes to convert the vacuum resid to gasoline and other valuable products A recent survey of resid cracking in the United States (P. G. Thiel, *Davison* 1982 Survey of Residuum Fluid Catalytic Cracking in the United States, Davison Catalagram, No. 66, 1983, Davison Chemical Division, W. R. Grace & Co., Baltimore, 1983) has shown that between February 1981 and October 1982 the number of resid cracking operations has doubled. Most of the refiners are now adding atmospheric bottoms along with their conventional gas oil feedstocks.

The addition of vacuum bottoms (boiling point greater than 500° C.) to the feed suggests that some very large asphaltene molecules may be present as a liquid aerosol, at least during the initial stages of the reaction. While diffusion limitations do not occur in conventional gas oil FCC units, in resid operations it becomes necessary to crack these large nonvolatile components under conditions where diffusion limitations may play a role in the overall reaction rate.

Among the new challenges faced by the catalyst manufacturer introduced by resid cracking therefore included is the necessity for catalysts to demonstrate improved activity for very large molecules while maintaining at least at previous levels such properties as resistance to metal poisoning, hydrothermal stability, low coke production and low cost.

After an extensive research program a catalytic product has been developed which has met the afore-mentioned criteria and has thus become the object of this invention.

This object has been accomplished by the development of a catalytic cracking process which utilizes a catalyst that comprises an inorganic oxide matrix and a crystalline aluminosilicate faujasitic Type Y zeolite which is characterized by smaller than conventional particle size. As stated previously, commercial Type Y zeolite is typically characterized by an effective particle size of about 0.3 to 0.4 micrometer, while the effective particle size characterizing the Type Y zeolite used in the catalysts and process of the present invention lies in the 0.05 to 0.3 micrometer range.

The invention's objectives were accomplished on the basis of the following rationale.

In order to be effectively converted to more valuable products, oil molecules must reach the external surface of the catalyst particle and diffuse through the pore structure to an active site. The reactants must then adsorb and react on the site. The products must then desorb, diffuse to the outer surface, and desorb from the particle into the bulk gas stream.

Residual oil is typically composed of very large molecules, a fraction of which boil above about 500° C. [J. G. Speight, *Chemistry and Technology of Petroleum*, Dekker, New York, 1980 and R. L. Richardson 2nd S. K. Alley, Div. Pet Chem., *Prepr., Am. Chem. Soc.*, 20(2), 554 (1975)]. Some may even be present in the form of an aerosol liquid during introduction and reaction in an FCC unit. This presents two problems. Both liquid and gas molecules must diffuse through the matrix to the zeolite, and then must react. Molecules of 20 A° or greater in diameter cannot be cracked easily inside the zeolite pore structure which is only accessible through 8–9 A° openings. Instead they are restricted to reaction on the external surface of the zeolite particles or to cages very close to the external surface. As a result, there are observable diffusion restrictions within the zeolite and a loss of activity for even moderate size molecules.

The catalyst product of the subject invention by exhibiting excellent conversion characteristics for these low boiling heavy hydrocarbons and by demonstrating superior selectivity for producing liquid products such as gasoline plus distillate obviously overcomes the problems encountered by conventional Type Y zeolite catalysts by virtue of its reduced particle size. The small particle faujasite has an increased external surface area (e.g. 50.9 $m^2/g$ equivalent to an effective particle size of 0.06 micrometer as compared to 9 $m^2/g$ equivalent to an effective particle size of 0.33 micrometer for conventional type Y faujasite) and activity as well as selectivity studies conducted have indeed shown that with a heavy resid feed the small particle sieve catalyst of the subject invention is both more active and yields more liquid product.

This increased surface area resulting from the decreased particle size provides the necessary external surface site for the residual oil's large molecules to crack, offsetting thereby the effect of diffusion restrictions within the zeolite.

Having thus elaborated on the background and on the essence of the subject invention we now proceed with a description of the more technical aspects thereof.

Basically, what has been done was to first produce the small particle Type Y zeolite, i.e. faujasite of a 0.05 to 0.06 micrometer effective particle size, according to the known procedure taught in U.S. Pat. No. 3,755,538. Secondly, the same procedure was used to produce a scaled up batch of said small particle Type Y zeolite in order to, thirdly, incorporate it into a cracking catalyst prepared according to the known proceoure taught in U.S. Pat. No. 3,957,689, said cracking catalyst being a composite of the small particle rare-earth exchanged Type Y zeolite clay, and a silica-alumina sol. Finally, in order to run comparative examples a cracking catalyst was prepared according to the same procedure taught in U.S. Pat. No. 3,957,689 which resulted in the above described product with the only difference being that conventional commercially available rare earth exchanged Type Y zeolite, i.e. Type Y zeolite of effective particle size 0.33 micrometer, was used.

Tests for comparative purposes were run on both of these catalysts by using a heavy oil cracking feed (73% boiling above 482° C.) and the results clearly demonstrated the superior performance of the invention's small particle Type Y zeolite catalyst composition over that of a conventionally sized Type Y zeol ite containing catalyst composition as will now be shown in the following specific examples.

EXAMPLE 1

Preparation of small particle sodium Type Y zeolite (NaY) faujasite (according to the teachings of U.S. Pat. No. 3,755,538).

A solution of dilute sulfuric acid containing 68 g concentrated sulfuric acid (96% $H_2SO_4$) is mixed with 200 ml water into a solution of 1,096 g sodium silicate solution (41° Bé: ratio 1.0 $Na_2O$:3.22 $SiO_2$) diluted with 400 ml water. A solution comprising 149 g sodium aluminate (21.4% $Al_2O_3$; 18.2% $Na_2O$) diluted with 170 g water is added. Finally 605 g seeds, whose oxide ratio is 16 $Na_2O$:1.0 $Al_2O_3$:15 $SiO_2$:320 $H_2O$, the preparation of which is taught by U.S. Pat. No. 3,574,538, is added to the blend. The resulting mixture of all of the above chemicals has the effective slurry oxide ratio of 6.5

$Na_2O$:1.0 $Al_2O_3$:16 $SiO_2$:280 $H_2O$ and was poured in a two liter polypropylene bottle, which was loosely capped. The bottle was then placed into an oven heated at 100±1° C. After the bottle was heated for 12 hours in the oven the slurry was filtered on a Buchner filter and the filter cake was rinsed three times with hot water. The filter cake was dried at 105±5° C. and a portion was analyzed by powder X-ray diffraction. The product was found to be a highly crystalline sodium Type Y zeolite having a unit cell size of 24.66 A and a $SiO_2/Al_2O_3$ ratio by chemical analysis of 5.0. Effective particle size of this sample by t-plot method was measured as 0.06 micrometer.

EXAMPLE 2

Preparation of Large Batch of Small Particle NaY

The process of Example 1 was essentially scaled up to yield approximately 5 kg of dry small particle faujasite. Two solutions and one slurry were prepared. Solution A was dilute sodium aluminate solution made by mixing 4,305 g sodium aluminate solution (21.4% $Al_2O_3$:18.2% $Na_2O$) into 6,400 g water. Solution B was made by mixing 1,981 g concentrated sulfuric acid (96% $H_2SO_4$) with 9,800 g water. A slurry was made from a mixture of 31.0 kg commercial sodium silicate (41° Bé; 1.0 $Na_2O$:3.22 $SiO_2$ ratio) with 6.8 kg water and 17.54 kg seeds. Each of the three chemicals—Solution A, Solution B, and the slurry composed of silicate, seeds, and water—was fed to a high speed mixer by its own pump. Solutions A and B were pumped at about 500 ml/min. while the slurry was pumped at about 2.8 liters/min. The slurry formed by the mixing of the three components was transferred to a 20 gallon closed reactor heated by a steam jacket and fitted with a condenser. After the slurry was placed into the reactor, it was heated with rapid stirring to 100±1° C. Then the mixer was turned off and the heating was continued for 9 hours. The crystallized slurry was filtered on a 50 cm Buchner filter and the filter cake washed with four 10 liter portions of hot water. A portion of the filter cake was dried at 105° C. and analyzed by powder X-ray diffraction. The product was found to be highly crystalline NaY faujasite zeolite which had a unit cell size of 24.66 A, a $SiO_2/Al_2O_3$ ratio of 5.0 by chemical analysis and a nitrogen surface area of 941 $m^2/g$ as measured by the BET method by a Digisorb 2500 instrument made by Micromeritics, Inc. of Norcross, Georgia. T plot effective particle size was measured as 0.06 micrometer. Portions of the batch of small particle NaY were made into various types of petroleum cracking catalysts and compared with commercial NaY zeolite as illustrated by the following examples.

EXAMPLE 3

Cracking Catalyst Made from Small Particle NaY, Clay and Silica-Alumina Sol

A petroleum cracking catalyst was made as follows according to the teachings of U.S. Pat. No. 3,957,689. A silica alumina sol was made by rapidly mixing a stream of sodium silicate solution, Solution A (12.5% $SiO_2$ made from the commercial sodium silicate as used in Examples 1 and 2 above), against a stream of acidified aluminum sulfate solution, Solution B (12.2% sulfuric acid and 30 grams/liter of aluminum sulfate $Al_2(SO_4)_3.16\ H_2O$).

Solution A and Solution B were rapidly mixed together in a high speed mixer in the approximate ratio of 1.5 l Solution A to 0.5 l Solution B and holding the pH at 3.1±0.1 until 12.0 kg sol was formed. Then 4,247 g kaolin clay (RC-32 kaolin from Thiele Kaolin Co. or Natka kaolin from National Kaolin Co. are suitable) were blended into the sol. Next a slurry of 986 g of particulate alumina ($Al_2O_3.H_2O$) having a total volatiles content or loss upon ignition of 25.4%, was slurried in one liter of water and acidified to pH 4 and added to the sol-clay-mixture. Lastly a slurry of 2609 g of filter cake of the small particle NaY (total volatiles=77%; $Na_2O$=13.2%) acidified to pH 4 was added to the sol-clay-alumina mixture. Then the slurry was spray dried in a Bowen spray dryer using an inlet temperature of 316° C. and an outlet temperature of 149° C.

A 3,000 g portion of the spray dried product was slurried in 11.3 l hot deionized water at 60°-71° C. and filtered. The filter cake was rinsed three times with 3 l of hot water. Then the cake was reslurried in 9 l of hot water and filtered again. The cake was rinsed three times with 3 l portions of hot water. The filter cake was next reslurried in 10 l of hot water and 215 ml of mixed rare earth chloride solution (60 wt.% $RECl_3.6\ H_2O$) were mixed into the slurry. The slurry was gently stirred for 20 minutes and kept at a temperature of 60°-71° C., and the pH was kept at 4.7-5.2. Lastly the slurry was filtered again and rinseo with three 3 l portions of hot water. The product was dried and found to be a microspheroidal, fluid catalyst which had a particle size in the range 40-120 micrometers.

EXAMPLE 4

Cracking Catalysts Made from Commercial NaY, Clay and Silica Alumina Sol

A similar catalyst similar to text of Example 3 was prepared using a commercial conventional NaY zeolite that has a $SiO_2/Al_2O_3$ ratio of about 4.9±0.1 and a t plot effective particle size of 0.33 micrometer. The finished catalyst was then oven dried at 149° C.

EXAMPLE 5

The catalysts prepared according to Examples 3 (small particle size) and 4 (conventional particle size) were here tested as follow.

Heavy oil cracking feed (HOC) in which about 73% boiled above 482° C., was cracked in the microactivity test using the test procedure published by F. G. Ciapetta and D. S. Henderson entitled "Microactivity Test For Cracking Catalysts". Oil and Gas Journal, Vol. 65, pages 88-93, Oct. 16, 1967. Microactivity tests are routinely used in the petroleum industry to evaluate cracking catalysts in the laboratory. The HOC feed was cracked over these catalysts using the following test conditions.

Temperature=515.6° C.

Weight Hourly Space Velocity (WHSV)=16

Catalyst to oil ratio was varied to investigate the yield of liquid products at different operating conditions.

HOC feed was passed through 5.0 g of catalyst. The products were collected and the percent conversion of gas oil into hydrogen, light gases, gasoline range hydrocarbons, etc. was determined by gas chromatography. Conversion of the heavier boiling fraction of the feed (fraction boiling above 482° C.) was also determined chromatographically.

The results of these compartive heavy oil cracking tests were tabulated as shown below and they provide the concrete evidence necessary to prove the superiority of the invention's small sized 0.06 micrometer Y-type faujasite comprising catalyst over the conventional 0.33 micrometer sized Y-type faujasite comprising catalyst both in terms of improved selectivity for liquid product and in terms of improved conversion of heavier boiling fraction of cracking feed.

| | Example 3 Product | | Example 4 Product | |
|---|---|---|---|---|
| Effective Particle Size of Y type faujasite, micrometer | .06 | | .33 | |
| Catalyst Formulation (Wt. %) | | | | |
| Zeolite | 10 | | 10 | |
| $SiO_2$ | 20 | | 20 | |
| $Al_2O_3$ from SRA | 10 | | 10 | |
| Clay | 60 | | 60 | |
| Chemical Analyses | | | | |
| $Na_2O$ | .24 | | .36 | |
| $RE_2O_3$ | 2.48 | | 2.12 | |
| Reactor Test Data After Indicated Deactivation-S13.5[1] | | | | |
| 1. Catalyst to oil ratio: | 2.9 | 3.8 | 2.9 | 4.0 |
| 2. Standard Conversion, V %: | 74.4 | 76.9 | 73.3 | 80.4 |
| 3. C5+ Gasoline, V %: | 60.6 | 64.9 | 61.3 | 61.5 |
| 4. Distillate, V %: | 16.9 | 15.7 | 15.7 | 13.6 |
| 5. G + D, V %: | 77.6 | 80.6 | 76.9 | 75.0 |
| 6. Average G + D, V %: | 79.1 | | 76.0 | |
| 7. Conversion of heavier boiling (above 482° C.) fraction of the feed: | 98.2 | 98.5 | 95.9 | 98.2 |
| 8. Average conversion of the heavier fraction of the feed: | 98.4 | | 97.1 | |

[1]Steam deactivation: 8 hours @ 732° C., 100% steam, 1.1 kg/cm$^2$ pressure of steam.

As may be concluded from the preceding tabulation of comparative results of catalytic cracking tests conducted using the invention's small size Type Y zeolite promoted catalytic composition versus a catalytic composition containing conventionally sized Type Y zeolite, the former's average conversion of the heavier fraction of feed and the former's average increase in production of gasoline and distillates exceed those of the latter.

Obviously, many modifications and variations of the invention may be made without departing from the essence and scope thereof and only such limitations should be applied as are indicated in the appended claims.

What is claimed is:

1. In a petroleum catalytic cracking process, a method of increasing the conversion of a heavy hydrocarbon fraction of a feedstock and of producing higher yields of liquid products, said method consisting in the use of a Y zeolite containing catalytic cracking catalyst wherein said Y zeolite is dispersed in an inorganic oxide matrix the improvement comprising the use of a Y zeolite characterized by a t plot external surface area of up to 100 m$^2$/g and an effective particle size in the range of 0.03 to 0.3 micrometer.

2. The method according to claim 1 further characterized in that the Y zeolite has a silica to alumina ratio above 4.5.

3. The method according to claim 1 wherein greater than about 20 weight % of said feedstock boils above about 482° C.

4. A catalytic cracking catalyst composition for contacting heavy hydrocarbon feedstocks that contain at least 20% by weight hydrocarbons that boil above about 482° C., comprising an inorganic oxide matrix, and a Y zeolite having a t plot external surface area of up to 100 m$^2$/g and an effective particle size 0.03 to 0.3 micrometer.

5. The composition of claim 4 wherein said catalyst contains from about 5 to 50 by weight of said zeolite.

6. The composition of claim 4 wherein said inorganic oxide matrix comprises silica, alumina, silica-alumina gels, cogels and sols, clay and mixtures thereof.

7. The composition of claim 4 wherein said Y zeolite is selected from the group comprising ultrastable Y, rare earth exchanged Y and mixtures thereof.

* * * * *